May 11, 1948.  A. W. ANISH  2,441,342
BENZOXOCARBOCYANINES AND METHOD OF PREPARATION
Filed March 10, 1944
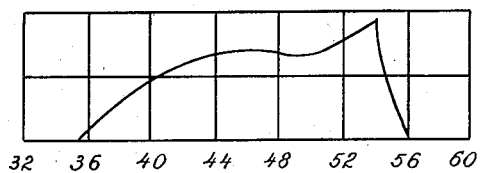
Example I
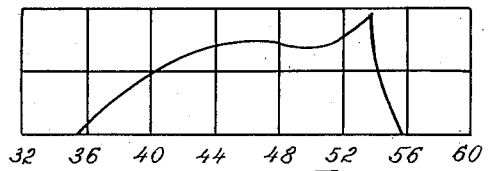
Example II
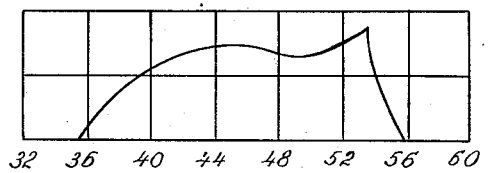
Example III
INVENTOR
Alfred W. Anish
BY
Henry W. Coughlin
ATTORNEY Patented May 11, 1948

UNITED STATES PATENT OFFICE 2,441,342

BENZOXOCARBOCYANINES AND METHOD OF PREPARATION

Alfred W. Anish, Johnson City, N. Y., assignor to General Aniline & Film Corporation, New York, N. Y., a corporation of Delaware Application March 10, 1944, Serial No. 525,935

1 Claim. (Cl. 260—240)

My invention relates to new benzoxocarbocyanine dyes, novel intermediates useful in the preparation of such dyes and to the methods of preparing both the novel dyes and intermediates.

More specifically, my invention relates to new benzoxocarbocyanine dyes of either the symmetrical or unsymmetrical series which contain as a substituent in the aryl nucleus, isomeric (secondary and tertiary) alkyl and aryl-alkyl groups. With respect to the intermediate utilized in the preparation of such dyes, the invention relates to new 2-alkylbenzoxazoles containing as a substituent in the aryl nucleus isomeric (secondary and tertiary) alkyl or aryl-alkyl groups.

The preparation of symmetrical benzoxocarbocyanines is well known in the prior art. I have found, however, that the introduction of the above mentioned alkyl or aryl-alkyl groups in the benzene nucleus of such carbocyanines have an unusual and novel effect in sensitizing photographic emulsions, which effect is highly desirable. I have discovered that the presence of these groups in the benzoxocarbocyanines produces a steep or sharp cut-off in the spectral curve as shown in the accompanying drawing. Such characteristics are highly desirable, especially in sensitizing dyes used in color photography emulsions, where it is desired that the multi-layer emulsions be sensitive to certain wave lengths.

My novel dyes may be represented by the following structural formula:

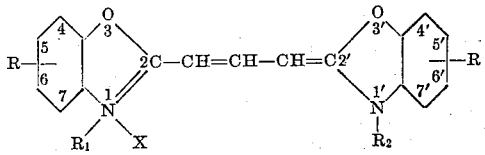

In the above formula R represents an isomeric (secondary and tertiary) alkyl or aryl-alkyl group, such as isobutyl, cumyl, isoamyl, tertiary amyl, tertiary hexyl, isopropyl, diisobutyl, 2-, or 3-methylbutyl groups. The groups which represent R may be the same or different in the dye.

R may be substituted in any suitable position in the benzene nucleus of the dyes, such as, for example the 5, 5', 6 or 6' position.

R₁ and R₂ represent an alkyl, aryl or aralkyl group such as methyl, ethyl, β-ethoxyethyl, butyl, allyl or benzyl.

X represents any anion such as, for example, —Cl, —Br, —I, —ClO₄, —NO₃, —SO₄CH₃, —SO₄C₂H₅,

or any other acid radical forming an alkyl or aralkyl ester.

The novel intermediates from which the above dyes may be prepared can be represented by the following structural formula:

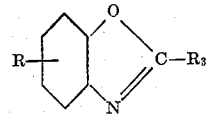

In the above formula R has the same significance as this symbol in the formula for the dyes given above. R₃ stands for an alkyl group.

It is accordingly an object of my invention to provide new benzoxocarbocyanine dyes and new intermediates for preparing the same. A further object is to provide a process for preparing such new products. Other objects will become apparent from the description which follows:

In accordance with my invention, I prepare the novel dyes by condensing a 2-methylbenzoxazole quaternary ammonium salt which is substituted in the benzene nucleus by a secondary or tertiary alkyl or aryl-alkyl group, in the presence of a suitable condensing agent, as for example ethyl o-formate. The intermediates are prepared from 2-nitro-phenols which are substituted in the benzene nucleus by a secondary or tertiary alkyl or aryl-alkyl radical. Such nitro-phenols may be prepared according to the process of U. S. Patent No. 2,207,727. The nitro-compound is then reduced to form the corresponding phenol amine, and the latter is finally reacted with a fatty acid, fatty acid anhydride or fatty acid-fatty acid anhydride mixture, such as acetic acid, acetic acid anhydride or a mixture of the two, to form the secondary or tertiary substituted 2-alkylbenzoxazole.

The following examples will serve to illustrate the method of forming the new benzoxocarbocyanine dyes:

*Example 1.*—1,1' - diethyl-6,6'-dicumyl - benzoxocarbocyanine iodide

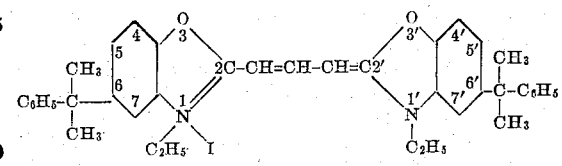

2.5 gms. of 2-methyl-6-cumyl-benzoxazole-ethyl-p-toluene sulfonate, 1.5 gms. of ethyl o-formate, and 10.0 cc. of pyridine were refluxed for 3 hours. The reaction mix was then cooled and poured into water containing potassium iodide and allowed to stand. The dye crystals were filtered and washed with water, and finally recrystallized from ethyl alcohol. Brilliant yellow, flat, prism-shaped dye crystals were obtained. The dye melts at 270° C. and yields a spectrogram with a sharp cut-off as shown in Figure 1.

Incorporated in a gelatino silver bromide emulsion containing about 4-5% of silver iodide, the dye imparts to it a range of sensitiveness from about 360 mµ to about 560 mµ with a sharp maximum at about 540 mµ.

Example 2.—1,1'-diethyl-6,6'-ditertiary-butyl-benzoxo-carbocyanine iodide.

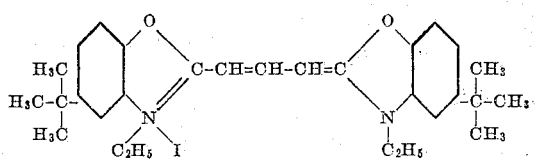

2.4 gms. each of 2-methyl-6-tertiary-butyl-benzoxazole-ethyl-p-toluene sulfonate and ethyl o-formate were condensed by refluxing in 10.0 cc. of pyridine for 2½ hours. The cooled reaction mixture was poured into water containing three grams of potassium iodide and allowed to stand. The water was decanted, the residue was washed with water followed by ethyl ether and then crystallized twice from ethanol. Red rhombic crystals were obtained. The dye melts at 257° C. and yields a spectrogram having a sharp cut-off as shown in Fig. 2.

Incorporated in a gelatino silver bromide emulsion containing about 4-5% of silver iodide, the dye imparts to it a range of sensitiveness from about 360 mµ to about 560 mµ with a sharp maximum at about 535 mµ.

Example 3.—1,1' diethyl-6,6'-diisoamyl-benzoxocarbocyanine perchlorate.

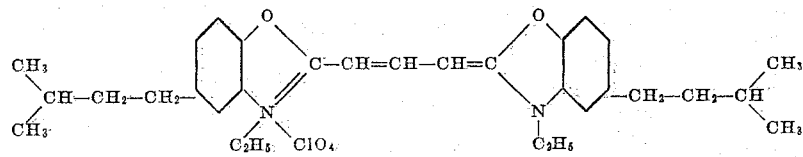

A mixture of 2.0 gms. of 2-methyl-6-isoamyl-benzoxazole-ethyl-p-toluene sulfonate and 2.0 gms. of ethyl o-formate in 10.0 cc. of pyridine was heated for 2½ hours. The cooled reaction mixture was diluted with water and on standing separated as an oil. After repeated washings with water the oil was dissolved in alcohol and diluted with a 10% sodium perchlorate solution. The dye crystals were separated and recrystallized from ethyl alcohol. Red, blue reflex (rhombic) crystals are obtained. The dye melts at 25° C. and yields a spectrogram having a sharp cut-off as shown in Figure 3.

Incorporated in a gelatino silver bromide emulsion containing about 4-5% of silver iodide, the dye imparts to it a range of sensitiveness from about 360 mµ to about 560 mµ with a sharp maximum at about 535 mµ.

To obtain dyes with the secondary and tertiary alkyl or aryl-alkyl substituent in the 5-position, I start with the corresponding benzoxazole. The procedure is otherwise the same for making such dyes as in Examples 1, 2 and 3 except that I start with the benzoxazole in which the cumyl, tertiary-butyl and diisoamyl radicles are substituted in the 5-position of the benzoxazole instead of the 6-position.

As illustrative of the new 2-alkylbenzoxazole intermediates and their method of preparation, the following examples are given:

Example 4

2-nitro-4-tertiary-butyl-phenol was prepared by the method described in U. S. 2,207,727 as follows: 150 grams of p-tertiary-butyl-phenol in 500 cc. of benzol was nitrated with a mixture of 128.0 cc. of 70% nitric acid and 256.0 cc. of water. The nitro compound was vacuum distilled and has a boiling point of 136° C. at 14 mm. The nitro-tertiary-butyl-phenol was then reduced with alkaline sodium hydrosulfite as follows:

20 grams of 2-nitro-4-tertiary-butyl-phenol in 800 cc. of 10% caustic soda solution were heated to 82° C. and 75.0 grams of sodium hydrosulfite added. The clear alkaline solution was acidified with dilute acetic acid and the white crystalline plates of 2-amino-4-tertiary-butyl-phenol precipitated. The compound melts at 162-4° C. The yield obtained was 16.4 grams. By heating 44.7 grams of the dried amino-tertiary-butyl-phenol with glacial acetic acid, or with an acetic acid-acetic acid anhydride mixture containing 75 cc. of each, 45.0 grams of 2-methyl-6-tertiary-butyl-benzoxazole were obtained. The compound has a B. P. of 137° C. at 16 mm.

When heated with ethyl p-toluene sulfonate, the substituted benzoxazole is converted into the corresponding quaternary ammonium salt.

Example 5

2-nitro-4-cumyl-phenol was prepared by nitrating a mixture of 24.2 grams of p-cumyl-phenol in 40.0 cc. of benzol with a mixture of 12.8 cc. of 70% nitric acid in 25.6 cc. of water at 7-10° C. The nitro compound has a boiling point of 145° C. at 15 mm. 2-amino-4-cumyl-phenol was obtained from the nitro compound by alkaline sodium hydrosulfite reduction. 2-methyl-6-cumyl-benzoxazole was then prepared by refluxing 8.2 grams of the 2-amino-4-cumyl-phenol with an acetic acid-acetic anhydride mixture containing 15 cc. of each, and finally dry distilling the reaction mixture. The 2-methyl-6-cumyl-benzoxazole obtained boils at 162° C. at 16 mm.

When heated with ethyl p-toluene sulfonate, the substituted benzoxazole is converted into the corresponding quaternary ammonium salt.

Example 6

2-nitro-4-isoamyl-phenol was prepared by nitrating a mixture of 37.4 grams of p-isoamyl-phenol in 150.0 cc. of benzene with a mixture of 22.6 cc. of 70% nitric acid diluted with 22.6 cc. of water at 0-8° C. The nitro compound has a boiling point 145-150° C. at 16 mm.

10.0 grams of the 2-nitro-4-isoamyl-phenol thus obtained were reduced with alkaline sodium hydrosulfite. 16 grams of the amino-compound so obtained were dry distilled from an acetic acid-acetic anhydride mixture containing 25 cc. of each to form 2-methyl-6-isoamyl-benzoxazole. The compound has a B. P. of 270° C. at 760 mm. and 147° C. at 16 mm.

When heated with ethyl p-toluene sulfonate, the substituted benzoxazole is converted into the corresponding quaternary ammonium salt.

To form the 5-substituted secondary and tertiary alkyl and aryl-alkyl benzoxazole intermediates I proceed in the same manner as set forth in Examples 4, 5 and 6, except that I start with a 2-nitro-phenol which is substituted in the 5-position with a tertiary-butyl, cumyl, or isoamyl radical, or any other secondary or tertiary alkyl or aryl-alkyl radical.

The benzoxazoles obtained according to these examples may be converted to other quaternary ammonium salts by heating with other suitable alkylating agents as ethyl iodide, methyl sulphate ethyl para-toluene sulfonate, diethyl sulphate, ethyl perchlorate, ethyl nitrate or any alkyl or alkaryl ester.

In general the benzoxazoles and their salts may be prepared according to the methods set forth in my U. S. Patent 2,429,178, issued October 14, 1947.

While the above examples disclose the preparation of the symmetrical carbocyanine dyes, it is obvious that the unsymmetrical dyes may be similarly formed. Thus 2-methyl - 6 - cumyl-benzoxazole-ethyl-p-toluene sulfonate may be condensed with 2-methyl-6-tertiary-butyl-benzoxazole-ethyl-p-toluene sulfonate in the presence of ethyl-o-formate to form a dye having the following structure.

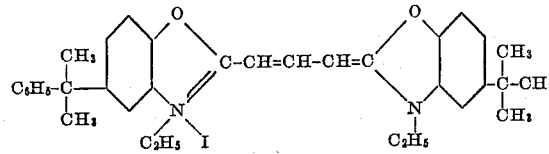

In similar manner, various unsymmetrical dyes may be made by reacting 2-methylbenzoxazoles having different secondary and tertiary substituents in the benzene nucleus.

Instead of condensing the benzoxazoles with ortho-formic acid esters, formaldehyde may be used. Likewise, the 2-β-acetanilidovinyl derivatives of the secondary and tertiary substituted benzoxazoles may be condensed with the secondary and tertiary substituted 2-alkylbenzoxazoles, such as, for example, the 2-methyl benzoxazoles to form the new benzoxocarbocyanines. The 2-β-acetanilidovinyl derivatives may be prepared according to the method set forth in my U. S. Patent 2,429,179, issued October 14, 1947.

The benzoxazole may be condensed with thiazoles or heterocyclic compounds other than benzoxazoles. But I have found that the resulting unsymmetrical dyes no longer have a sharp cut-off, but flat maxima.

The dye may be substituted in the central carbon atom of the polymethine chain by an alkyl or other group. However, I have found that the resulting dye does not have the sharp spectral cut-off in the spectral curve as the dye which is unsubstituted in the polymethine chain.

From the above examples it is apparent that a large number of condensations are possible with the novel benzoxazole intermediates. The resulting dyes which are formed are highly useful as sensitizers for photographic silver halide emulsions, giving a sharp cut-off in the spectral curve.

The accompanying drawing illustrates and depicts the sensitivity of emulsions containing three of my dyes. Each figure is a diagrammatic reproduction of a spectrogram showing the sensitivity of a silver bromide emulsion containing one of my dyes.

Fig. 1 shows the sensitivity of an ordinary gelatino-silver bromide including silver iodide and containing the dye of Example 1. It depicts the steep cut-off in the spectral curve.

Fig. 2 shows the sensitivity of an ordinary gelatino-silver bromide including silver iodide and containing the dye of Example 2. It depicts the steep cut-off in the spectral curve.

Fig. 3 shows the sensitivity of an ordinary gelatino-silver-bromide including silver iodide and containing the dye of Example 3. It depicts the steep cut-off in the spectral curve.

I claim:

1. 1,1'-diethyl-6.6'-dicumyl-benzoxocarbocyanine iodide characterized by the following formula:

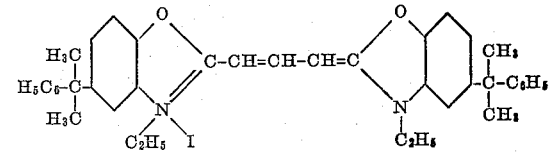

ALFRED W. ANISH.

REFERENCES CITED

The following references are of record in the file of this patent:

UNITED STATES PATENTS

| Number | Name | Date |
|---|---|---|
| 2,060,383 | Schneider | Nov. 10, 1936 |
| 2,066,967 | Dieterle | Jan. 5, 1937 |
| 2,173,486 | Schneider | Sept. 19, 1939 |
| 2,230,257 | Middleton | Feb. 4, 1941 |
| 2,233,509 | Brooker | Mar. 4, 1941 |
| 2,354,524 | Kumetal | July 25, 1944 |

OTHER REFERENCES

Ser. No. 419,570, Reister (A. P. C.), pub. Apr. 20, 1943.